United States Patent
Iwai et al.

(10) Patent No.: US 10,215,247 B2
(45) Date of Patent: Feb. 26, 2019

(54) BICYCLE BRAKE PAD AND METHOD FOR MANUFACTURING BICYCLE BRAKE PAD

(71) Applicant: Shimano Inc., Sakai, Osaka (JP)

(72) Inventors: Toru Iwai, Sakai (JP); Makoto Souwa, Sakai (JP)

(73) Assignee: SHIMANO INC., Osaka (JP)

( * ) Notice: Subject to any disclaimer, the term of this patent is extended or adjusted under 35 U.S.C. 154(b) by 0 days.

(21) Appl. No.: 15/006,121

(22) Filed: Jan. 26, 2016

(65) Prior Publication Data

US 2016/0223042 A1  Aug. 4, 2016

(30) Foreign Application Priority Data

Jan. 30, 2015 (JP) ................. 2015-017244

(51) Int. Cl.
| | |
|---|---|
| *F16D 65/04* | (2006.01) |
| *F16D 69/02* | (2006.01) |
| *B62L 1/00* | (2006.01) |
| B22F 3/23 | (2006.01) |
| F16D 69/04 | (2006.01) |
| B22F 5/00 | (2006.01) |

(52) U.S. Cl.
CPC ............. *F16D 69/027* (2013.01); *B62L 1/00* (2013.01); *B22F 3/23* (2013.01); *B22F 5/006* (2013.01); *B22F 2998/10* (2013.01); *B22F 2999/00* (2013.01); *F16D 2069/0466* (2013.01); *F16D 2200/003* (2013.01); *F16D 2200/0082* (2013.01)

(58) Field of Classification Search
CPC ..... B62L 1/005; F16D 65/092; F16D 69/0408

USPC ................. 188/250 B, 250 G, 251 A, 251 M
See application file for complete search history.

(56) References Cited

U.S. PATENT DOCUMENTS

| | | | | |
|---|---|---|---|---|
| 3,110,571 A | * | 11/1963 | Alexander | C03C 27/00 228/122.1 |
| 4,049,090 A | * | 9/1977 | Buell | F16D 65/125 188/251 M |
| 4,146,654 A | * | 3/1979 | Guyonnet | B05B 7/226 219/121.47 |
| 5,199,481 A | * | 4/1993 | Corwin | B22D 19/14 164/103 |
| 5,922,452 A | * | 7/1999 | Takahashi | C22C 32/0089 428/323 |
| 6,394,236 B1 | | 5/2002 | Matsuishita | |
| 6,753,090 B2 | * | 6/2004 | Haug | C23C 4/16 428/469 |
| 7,208,432 B1 | * | 4/2007 | Beier | C03C 14/002 106/36 |
| 7,278,519 B2 | * | 10/2007 | Iwai | B62L 1/005 188/1.11 W |
| 7,490,704 B2 | * | 2/2009 | Hara | F16D 69/0408 188/250 G |
| 8,365,881 B2 | | 2/2013 | Iwai et al. | |

(Continued)

FOREIGN PATENT DOCUMENTS

| | | |
|---|---|---|
| DE | 19750599 A1 | 7/1998 |
| DE | 69434085 T2 | 10/2005 |

(Continued)

*Primary Examiner* — Christopher P Schwartz

(57) ABSTRACT

A bicycle brake pad includes a friction member and a first support member. The friction member includes a first intermetallic compound. The friction member and the first support member are, at least partially, chemically coupled to each other.

58 Claims, 9 Drawing Sheets

(56) References Cited

U.S. PATENT DOCUMENTS

| | | | | |
|---|---|---|---|---|
| 8,550,220 | B2* | 10/2013 | Iwai | F16D 65/092 |
| | | | | 188/218 XL |
| 9,470,284 | B2* | 10/2016 | Iwai | C22C 1/0491 |
| 2003/0209103 | A1* | 11/2003 | Takayama | C22C 32/00 |
| | | | | 75/231 |
| 2005/0269167 | A1* | 12/2005 | Iwai | B62L 1/005 |
| | | | | 188/26 |
| 2007/0227841 | A1* | 10/2007 | Hara | B62L 1/005 |
| | | | | 188/251 A |
| 2008/0230332 | A1* | 9/2008 | Iwai | F16D 65/092 |
| | | | | 188/250 B |
| 2014/0109723 | A1 | 4/2014 | Ishimoto et al. | |
| 2016/0032992 | A1* | 2/2016 | Mohseni | F16D 65/092 |
| | | | | 188/251 A |
| 2016/0116012 | A1* | 4/2016 | Iwai | C22C 1/0491 |
| | | | | 188/251 A |
| 2018/0066168 | A1* | 3/2018 | Kamei | C09K 3/149 |

FOREIGN PATENT DOCUMENTS

| | | |
|---|---|---|
| EP | 0731186 A1 | 9/1996 |
| EP | 1176228 A2 | 1/2002 |
| JP | H01-153826 A | 6/1989 |
| JP | H09-60673 | 3/1997 |
| JP | 2001-139936 A | 5/2001 |
| JP | 2001-295873 A | 10/2001 |
| JP | 2005-030565 A | 2/2005 |
| JP | 2007-314598 A | 12/2007 |
| JP | 2012-207289 A | 10/2012 |

* cited by examiner

10,215,247 B2

BICYCLE BRAKE PAD AND METHOD FOR MANUFACTURING BICYCLE BRAKE PAD

TECHNICAL FIELD

The present invention relates to a bicycle brake pad.

BACKGROUND ART

A bicycle disc brake system moves a brake pad in accordance with the operation of a brake lever to generate braking force by producing friction with a brake pad friction member and a disc rotor. A conventional brake pad includes a friction member and a support member, which supports the friction member. A metal pad is known as such a brake pad. The friction member of the metal pad is composed of a metal composite material and substantially does not include resins. In such a metal pad, the friction member has a large thermal conductivity. This makes it difficult to couple the friction member and the support member with an adhesive agent. Thus, the friction member and the support member need to be mechanically coupled to each other. However, in comparison with coupling that is performed with an adhesive agent, additional components and steps are required to perform mechanical coupling such as swage-coupling.

SUMMARY OF THE INVENTION

It is an object of the present invention to easily obtain a brake pad having a simple structure.

A first aspect of the present invention is a bicycle brake pad which includes a friction member and a first support member. The friction member includes a first intermetallic compound. The friction member and the first support member are, at least partially, chemically coupled to each other.

A second aspect of the present invention is a bicycle brake pad which includes a friction member and a first support member. The first support member includes Al. The friction member and the first support member are, at least partially, inorganically and chemically coupled to each other.

In one implementation, the friction member includes a first intermetallic compound.

A third aspect of the present invention is a bicycle brake pad. The brake pad includes a friction member and a first support member. The friction member includes a first intermetallic compound formed from at least two selected from a group consisting of Cu, Ti, Zn, Ni, and Al. The first support member supports the friction member.

In one implementation, the first intermetallic compound is produced by performing combustion synthesis on metal materials including two selected from a group consisting of Cu, Ti, Zn, Ni, and Al.

In one implementation, the first intermetallic compound is produced by performing the combustion synthesis on the metal materials with an additive material added thereto.

In one implementation, the additive material includes carbon.

In one implementation, the metal materials include Cu and Ti; and the first intermetallic compound is a Cu—Ti intermetallic compound including at least one of TiCu, $Ti_2Cu$, $Ti_3Cu_4$, $Ti_2Cu_3$, and $TiCu_4$.

In one implementation, the friction member further includes at least one of TiC and $Cu_3Ti_3O$.

In one implementation, the friction member further includes a metal phase including at least one of the metal materials.

In one implementation, the metal phase includes Cu.

In one implementation, the first support member includes Al. The friction member and the first support member are, at least partially, inorganically and chemically coupled to each other by a second intermetallic compound formed from Al of the first support member and at least one of the metal materials.

In one implementation, the second intermetallic compound is formed by heat produced during combustion synthesis of the first intermetallic compound.

In one implementation, the metal materials include Cu and Ti. The second intermetallic compound includes $Al_2Cu$.

In one implementation, the brake pad further includes a second support member that supports the friction member and the first support member. The first support member and the second support member are mechanically coupled to each other.

In one implementation, the first support member includes a projection. The second support member includes a recess. The first support member and the second support member are mechanically coupled to each other by the projection of the first support member that enters the recess of the second support member when combustion synthesis of the first intermetallic compound produces heat that softens or melts the projection.

In one implementation, the recess of the second support member is increased in diameter toward an opposite side of the friction member.

In one implementation, the recess of the second support member is a stepped through bore.

In one implementation, the second support member has the form of a plate.

In one implementation, the friction member and the first support member are, at least partially, inorganically and chemically coupled to each other by diffusion bonding.

In one implementation, the first support member has the form of a plate.

A fourth aspect of the present invention is a method for manufacturing a bicycle brake pad, the method includes forming a workpiece including metal materials and an additive material and arranging the workpiece, a first support member that includes metal, and a second support member that includes a recess so that the first support member contacts the workpiece and the second support member. The method further includes heating the workpiece to obtain the friction member. The heating includes generating a first intermetallic compound from the metal materials through combustion synthesis, chemically coupling the friction member and the first support member with a second intermetallic compound formed by heat produced by the combustion synthesis of the first intermetallic compound, and mechanically coupling the first support member and the second support member by softening or melting the first support member with the heat produced by the combustion synthesis of the first intermetallic compound so that the first support member enters the recess.

In one implementation, the metal materials include at least two selected from a group consisting of Cu, Ti, Zn, and Al. Further, the first support member includes Al.

In one implementation, the metal materials include Cu and Ti, and the second intermetallic compound includes $Al_2Cu$.

A fifth aspect of the present invention is a method for manufacturing a bicycle brake pad. The method includes obtaining a friction member, and diffusion-bonding the friction member and the first support member by heating and pressurizing the friction member and the first support member.

In one implementation, the obtaining includes forming a workpiece that includes metal materials and an additive material, and heating the workpiece to generate a first intermetallic compound from the metal materials through combustion synthesis.

In one implementation, the metal materials include at least two selected from a group consisting of Cu, Ti, Zn, Ni, and Al. The first support member includes Al.

The present invention easily obtains a brake pad having a simple structure.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

Figure 1A:
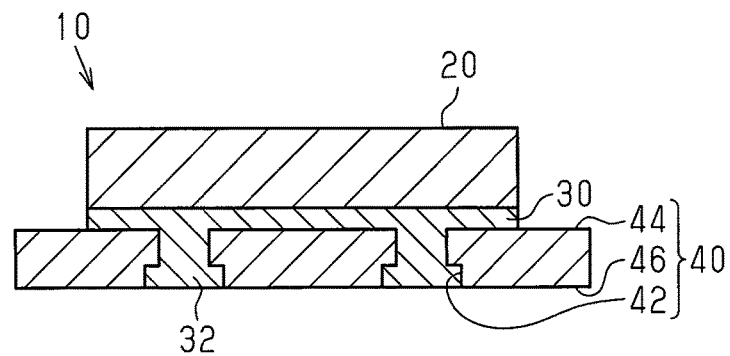
FIG. 1A is a schematic cross-sectional view showing a brake pad of a first embodiment.
Figure 1B:
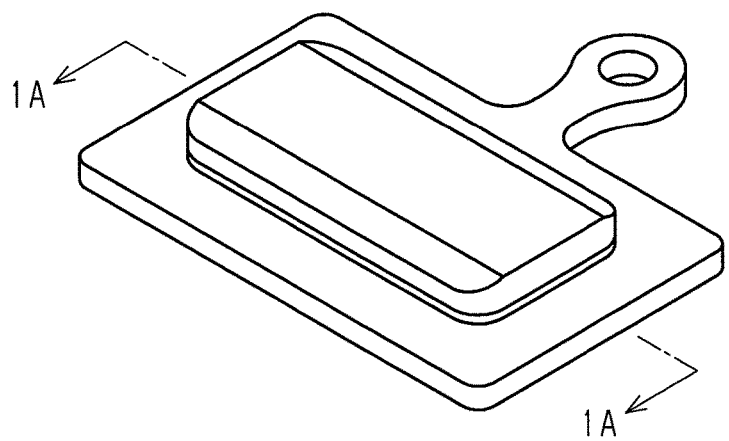
FIG. 1B is a perspective view showing the brake pad of the first embodiment.

The structure of a bicycle brake pad 10 in a first embodiment will now be described with reference to FIGS. 1A and 1B. The brake pad 10 is used in a bicycle disc brake system. The brake pad 10 includes a friction member 20, which includes a first intermetallic compound, and a first support member 30. The friction member 20 and the first support member 30 are, at least partially, chemically coupled to each other. The friction member 20 includes a friction surface and a supported surface (which may be referred to as a coupling surface), which is located at the opposite side of the friction surface. Preferably, the entire surface of the supported surface is chemically coupled to the first support member 30.

The first support member 30 includes metal, that is, at least Al. The brake pad 10 may further include a second support member 40 that supports the friction member 20 and the first support member 30. The first support member 30 and the second support member 40 are mechanically coupled to each other. The second support member 40 functions as a back plate fixed to a brake pad mount, which is arranged on a brake caliper.

In the first embodiment, the second support member 40 includes at least one recess 42. The first support member 30 is mechanically coupled or engaged with the second support member 40 at the recess 42. The recess 42 includes a relatively small opening (upper opening in FIG. 1A), which is located in an upper surface 44 of the second support member 40, and a relatively large opening (lower opening in FIG. 1A), which is located in a lower surface 46 of the second support member 40. The recess 42 is, for example, a stepped through bore. The material of the second support member 40 is not particularly limited and may be a weather resistant material such as stainless steel or titanium.

A method for manufacturing the brake pad 10 will now be described with reference to FIGS. 2 to 5.

Figure 2:
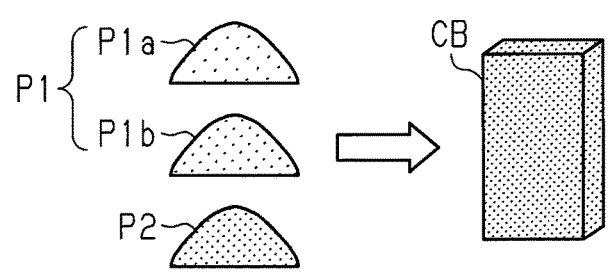
FIG. 2 is a schematic diagram illustrating a method for manufacturing the brake pad of the first embodiment.

In a first step shown in FIG. 2, a workpiece CB is formed including a plurality of metal materials P1 (P1a, P1b, and so forth) and at least one additive material P2. The metal materials P1 and the at least one additive material P2 undergo pressure-molding to obtain the workpiece CB. Each of the materials P1 and P2 are powdered and form the friction member 20, which includes a first intermetallic compound, in a third step, which will be described later. There may be three or more types of the metal materials P1. The additive material P2 functions as a filler, a solid lubricant, a friction coefficient adjusting agent, or the like.

Figure 3:
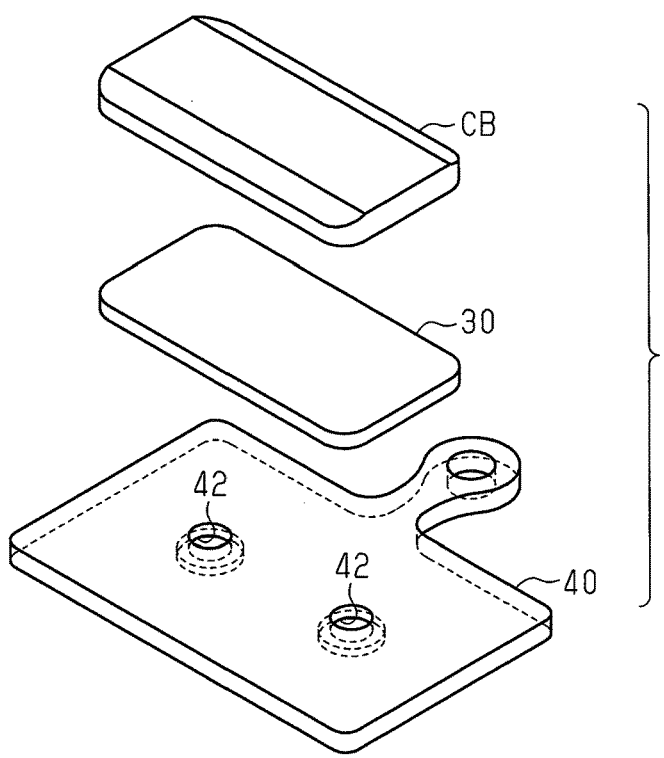
FIG. 3 is a schematic diagram illustrating the method for manufacturing the brake pad of the first embodiment.

In a second step shown in FIG. 3, the workpiece CB, the first support member 30, and the second support member 40 are stacked to form a triple-layer laminated body. The workpiece CB, the first support member 30, and the second support member 40 are arranged so that the first support member 30 contacts the workpiece CB and the second support member 40. In the first embodiment, the first support member 30 is a flat plate including Al.

Figure 4:
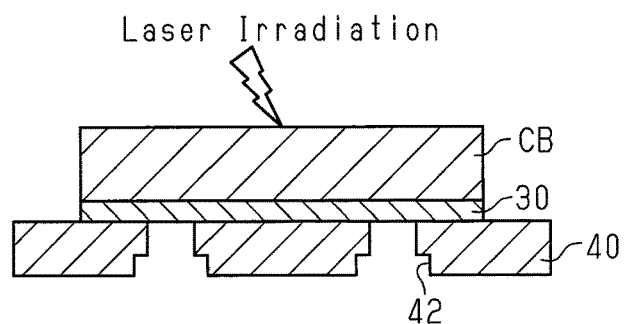
FIG. 4 is a schematic diagram illustrating the method for manufacturing the brake pad of the first embodiment.

In a third step shown in FIG. 4, the workpiece CB is heated to obtain the friction member 20. The workpiece CB is heated so that combustion synthesis of at least two of the metal materials generates the first intermetallic compound in the friction member 20. In the first embodiment, the combustion synthesis is started by applying an external heat stimulus to the workpiece CB from the outside to induce a local combustion reaction, which is an exothermic reaction, in the workpiece CB. More specifically, the combustion reaction is started by locally irradiating the workpiece CB with a laser beam and locally heating the workpiece CB. For example, an external heat stimulus is applied to one side of the workpiece CB (upper surface opposite to first support member 30) to induce a combustion reaction at that side. The combustion reaction continuously advances from one side to the other side of the workpiece CB (e.g., lower surface that contacts first support member 30). The combustion synthesis is completed within an extremely short period of time and does not need to be continuously heated from the outside. This significantly reduces the amount of heating energy supplied from the outside. Accordingly, the combustion significantly reduces the cost for manufacturing the friction member 20 that has a superior braking capability and includes the first intermetallic compound.

In addition to inducing the generation of the friction member 20, the heating performed in the third step, that is, the local application of an external heat stimulus, induces the chemical coupling of the friction member 20 with the first support member 30 and the mechanical coupling of the first support member 30 with the second support member 40. For example, the heat produced during the combustion synthesis of the first intermetallic compound in the friction member 20 induces a second combustion reaction of at least one of the metal materials P1 of the workpiece CB (e.g., Cu) with a metal of the first support member 30 (e.g., Al). The second combustion reaction generates a second intermetallic compound (e.g., $Al_2Cu$) that inorganically and chemically couples the friction member 20 and the first support member 30. Further, the heat produced during the combustion synthesis of the first intermetallic compound softens or melts a portion of the first support member 30. The softened or melted portion of the first support member enters the recess 42 of the second support member 40 and forms a projection 32. The projection 32 and the recess 42 function as a mechanical joint that mechanically couples the first support member 30 and the second support member 40.

Figure 5:
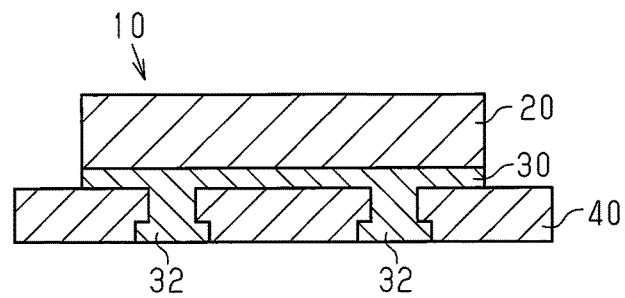
FIG. 5 is a schematic diagram illustrating the method for manufacturing the brake pad of the first embodiment.

In this manner, the application of an external heat stimulus to one side of the workpiece CB results in a chain reaction or automatic progress of sequences including the generation of the friction member 20, the chemical coupling of the friction member 20 and the first support member 30, and the mechanical coupling of the first support member 30 and the second support member 40. The sequences automatically end when the combustion reaction is completed. This manufactures the brake pad 10 as shown in FIG. 5. As described above, the combustion synthesis is completed within an extremely short period of time, continuous heating from the outside is not necessary, and the amount of heating energy supplied from the outside is extremely small. Accordingly, the manufacturing cost of the brake pad 10 is significantly reduced.

The chemical coupling of the friction member 20 and the first support member 30 will now be described.

Figure 6:
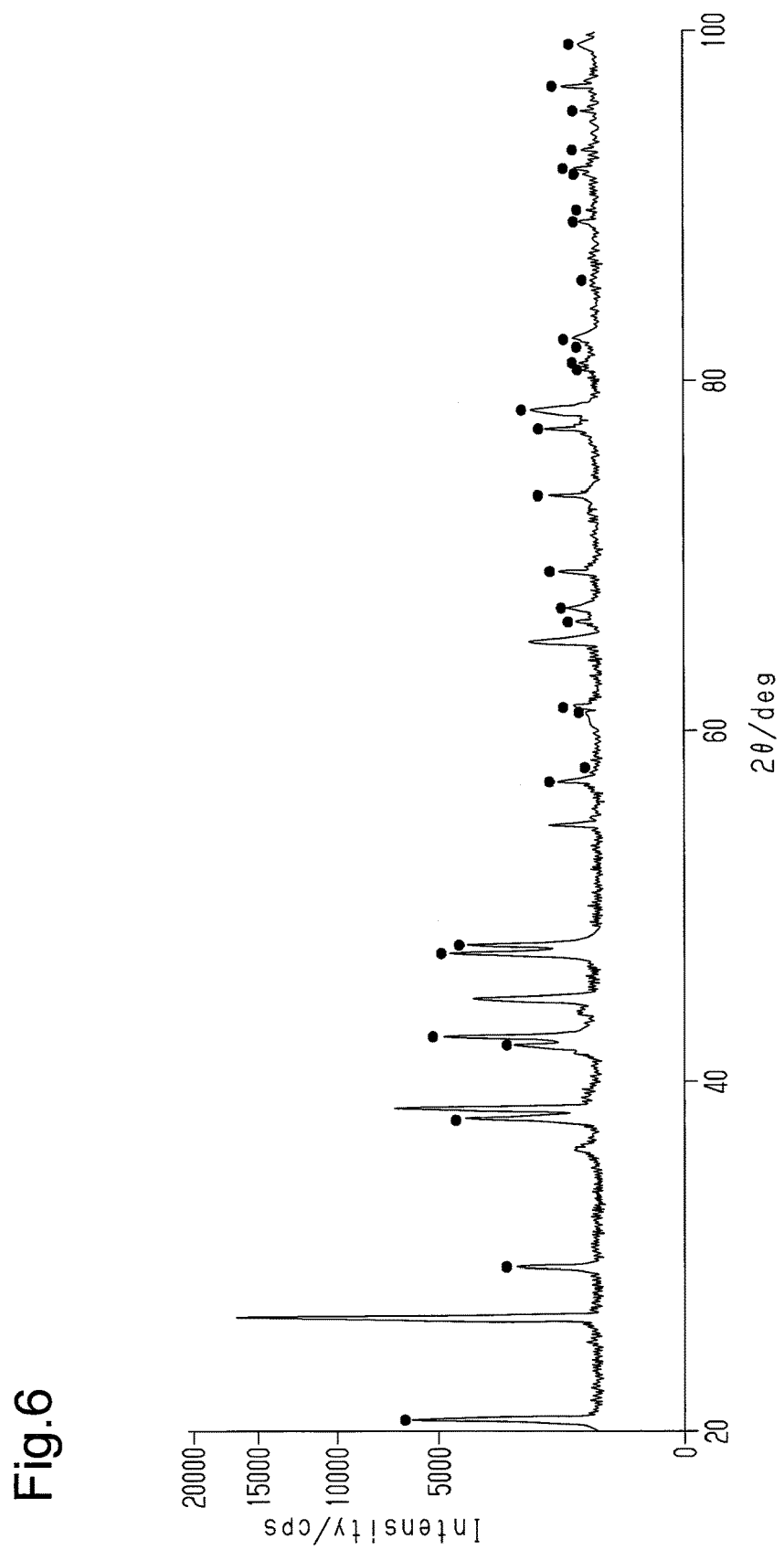
FIG. 6 is an X-ray analysis chart of a sample obtained from a boundary structure of a friction member and a first support member in a brake pad of example 1.

FIG. 6 is an X-ray analysis chart of a sample obtained from a boundary structure of the friction member 20 and the first support member 30 in the brake pad 10 of example 1. In example 1, the first support member 30 is an Al plate. Further, the workpiece CB, which forms the friction member 20, includes copper powder and titanium powder as the metal material P1 and carbon powder as the additive material P2. The X-ray analysis chart of FIG. 6 indicates the existence of the second intermetallic compound that is a reaction product excluding components included in the friction member 20 and the first support member 30. The second intermetallic compound is an inorganic compound and includes $Al_2Cu$ that is formed from Al, which is the metal of the first support member 30, and Cu, which is a metal material of the friction member 20. The dots shown in FIG. 6 indicate diffraction peaks of $Al_2Cu$. The existence of the second intermetallic compound indicates that the friction member 20 and the first support member 30, are at least partially, inorganically and chemically coupled to each other.

A rotating rotor was pushed against the brake pad 10 of example 1 by a force of 3618 N to check the durability of the brake pad 10. The friction member 20 and the first support member 30 remained coupled together until when the first support member 30 was completely worn due to contact with the rotor. This indicates the rigid bonding of the friction member 20 and the first support member 30 in addition to the high durability of the brake pad 10.

The friction member 20 will now be described.

The friction member 20 is composed of a composite material that includes the first intermetallic compound. The friction member 20, which includes the first intermetallic compound, has a superior braking performance, such as high-temperature braking force (fade performance), ratio of braking force under a wet condition and braking force under a dry condition (wet/dry ratio), wear resistance, and braking noise. In particular, the friction member 20 of the first embodiment allows the wet-dry ratio to be close to 1 and allows for reduction in the braking noise. Preferably, the first intermetallic compound includes at least one of TiCu, $Ti_2Cu$, $Ti_3Cu_4$, $Ti_2Cu_3$, and $TiCu_4$. The friction member 20 may further include at least one of TiC and $Cu_3Ti_3O$.

Figure 7A:
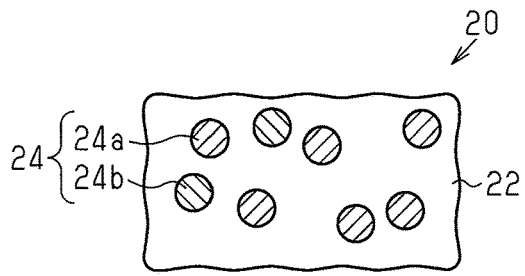
FIGS. 7A and 7B are schematic diagrams illustrating the microscopic structure of the friction member.

The microscopic structure of the friction member 20 will now be described. As shown in FIG. 7A, the friction member 20 includes a metal phase 22 and an intermetallic compound (intermetallic compound particles) having uniform or non-uniform shapes. The intermetallic compound 24 is usually dispersed in the metal phase 22 to form a dispersion phase, a grain phase, or a second phase. The first intermetallic compound is, for example, a Cu—Ti intermetallic compound including at least one of TiCu, $Ti_2Cu$, $Ti_3Cu_4$, $Ti_2Cu_3$, and $TiCu_4$. In the example of FIG. 7A, the first intermetallic compound 24 includes $Ti_2Cu$ and $TiCu_4$ as first metallic compounds 24a and 24b. The metal phase 22 includes at least one of Cu, Al, Zn, and Ni. In the example of FIG. 7A, the metal phase 22 is a single-metal phase such as a metal Cu phase. That is, the friction member 20 includes an intermetallic compound 24, which is obtained from a first metal (here, Cu) and a second metal (here, Ti), and a metal phase 22 of the first metal (here, Cu). In several examples, the metal phase 22 may be a metal solid solution phase such as a CuTi solid solution. Further, in several examples, the metal phase 22 may be the intermetallic compound.

Figure 7B:
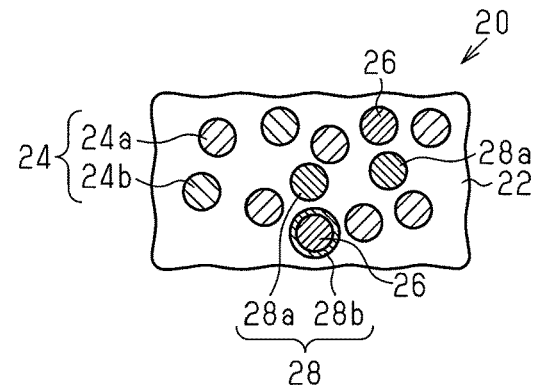

In the example of FIG. 7B, the friction member 20 includes non-metal particles 26 and reinforced phases 28 that are dispersed in the metal phase 22. The non-metal particles 26 are, for example, carbon particles. The reinforced phases 28 are, for example, $Cu_3Ti_3O$ or TiC. The reinforced phases 28 may include particle-like reinforced phases 28a and/or film-like reinforced phases 28b. The film-like reinforced phases 28b may partially or entirely cover some of the non-metal particles 26. In several examples, the particle-like reinforced phases 28a and the film-like reinforced phases 28b form a meshed reinforced structure.

The metal materials P1 and the additive material P2 are selected and configured to enhance the progress of the combustion synthesis of the first intermetallic compound. In the first embodiment, the metal materials P1 include copper powder P1a and titanium powder P1b, and the additive material P2 includes carbon powder. As will be described later, the workpiece CB, which includes titanium powder and carbon powder, undergoes combustion synthesis to obtain a composite material that includes the first intermetallic compound, which includes at least one of TiCu, $Ti_2Cu$, $Ti_3Cu_4$, and $Ti_2Cu_3$, and $TiCu_4$. Although a block composed of a typical intermetallic compound is generally brittle and cracks easily, the friction member 20 of the present embodiment, which is composed of the composite material including the first intermetallic compound, resists cracking. Accordingly, the friction member 20 of the first embodiment has superior durability and superior manufacturing yield in addition to having a superior braking capability.

The particle diameters of the metal materials P1 and the additive material P2 are appropriately determined by taking into consideration the easiness for molding the workpiece CB and the enhancement of the advancement of the combustion synthesis. For example, the particle diameter may be in the range of 1 to 200 μm. When a reactant system includes copper powder, titanium powder, and carbon powder, the particle diameter of copper powder that is the main component of a metal phase may be greater than the diameter of a titanium particle and a carbon particle. In one example, the particle diameter of the copper powder is 100 to 180 μm, the particle diameter of the titanium particle is 10 to 100 μm, and the particle diameter of the carbon particle is 1 to 10 μm.

When taking into consideration enhancing the advancement of the combustion synthesis and the thermal performance of the friction member, a higher purity of copper powder is more preferable. It is particularly preferred when the purity of copper powder is 99% or higher. Pure titanium may be used as the titanium powder. However, recycled titanium powder, which can be obtained at a low cost, may be used. The carbon powder is preferably graphite, which can be obtained at a low cost. Graphite decreases cracking in the composite material that includes the intermetallic compound and functions as a solid lubricant that reduces the braking noise.

In addition to or in lieu of carbon powder, the additive material P2 may include one or more non-carbon hard particles, such as mullite, zircon, calcium fluoride, or sericite. The non-carbon hard particles functions as a filler, a solid lubricant, a friction coefficient adjusting agent, or the like.

The advantages of the reactant system including copper powder, titanium powder, and carbon powder will now be described with reference to FIGS. 8A and 8B.

Figure 8A:
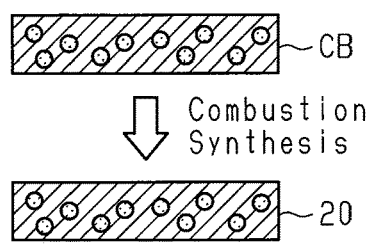
FIGS. 8A and 8B are schematic diagrams respectively illustrating the brake pad of example 1 and a brake pad of comparative example 1.

FIG. 8A shows a workpiece CB used to form the brake pad 10 of example 1. The workpiece CB includes copper powder P1a and titanium powder P1b, which serve as the metal materials P1, and carbon powder, which serves as the additive material P2. The workpiece CB was subjected to combustion synthesis to obtain the friction member 20, the shape of which was substantially identical to its original flat shape. The friction member 20 was usable as the friction member 20 without undergoing any processes or by slightly undergoing profile shaping. In this manner, example 1 allows the brake pad 10 including the friction member 20 with the desired shape to be manufactured with a high yield.

Figure 8B:
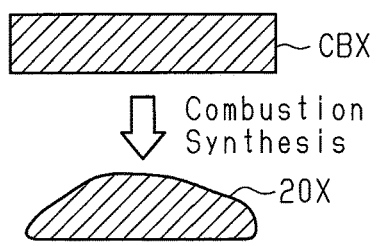

FIG. 8B shows a workpiece CBX of comparative example 1 molded to have a flat shape and composed of copper powder and titanium powder. The workpiece CBX of comparative example 1 was subjected to combustion synthesis to obtain a reaction product 20X, which was deformed such that the shape differed from its original flat shape. Thus, the reaction product 20X of comparative example 1 cannot be directly used as a friction member. Further, it is either difficult or impossible to shape and return the reaction product 20X to its original shape.

Although not shown in the drawings, in comparative example 2, a workpiece having a flat shape was molded containing aluminum powder, titanium powder, and carbon powder. When the workpiece of comparative example 2 was subjected to combustion synthesis, a reaction product having many cracks was obtained. Thus, comparative examples 1 and 2 using workpieces that do not have the combination of copper powder, titanium powder, and carbon powder cannot manufacture the brake pad 10, which includes a friction member having the desired shape, with a high yield.

From an analysis result of the friction member 20 of example 1, it is assumed that the reaction caused by combustion synthesis advances as follows. Before combustion synthesis is started, copper powder, titanium powder, and carbon powder are mixed in the workpiece CB. When the combustion synthesis is started, solid-phase diffusion first advances between copper atoms of the copper powder and titanium atoms of the titanium powder to form a copper titanium solid solution. As the combustion synthesis advances, an intermetallic compound that includes at least one of TiCu, $Ti_2Cu$, $Ti_3Cu_4$, $Ti_2Cu_3$, and $TiCu_4$ is composed of the copper atoms and the titanium atoms of the copper titanium solid solution. After the combustion synthesis ends, the intermetallic compound disperses in the metal phase formed by the copper titanium solid solution. The carbon powder disperses in the metal phase. As the combustion synthesis advances, carbon atoms of the carbon powder react with or chemically bond to the titanium atoms of the metal phase to form a TiC reinforced phase or reinforced structure. In the same manner, as the combustion synthesis advances, oxygen atoms react with the titanium atoms and the copper atoms in the metal phase and form a $Cu_3Ti_3O$ reinforced phase or a reinforced structure. It is assumed that these reinforced structures significantly decreases movement of the intermetallic compound, that is, deformation of the reaction product. In accordance with the type and amount of the powder forming the workpiece CB, the metal phase may be formed from at least one selected from a group consisting of a metal solid solution, an intermetallic compound, pure metal, and any combination of these matters.

In the workpiece CB of example 1, it is preferred that the carbon powder serving as the additive material be 10 to 30 wt % of the total weight of the copper powder P1a. The mixing of carbon powder within this range decreases cracks in the friction member 20 having the desired shape, improves the yield of the friction member 20, and reduces the manufacturing cost. Preferably, the workpiece CB contains 0.1 to 50 wt % of the titanium powder P1b relative to the total weight of the copper powder P1a. The mixing of titanium powder within this range prevents or decreases cracking in the friction member 20 during or after the combustion synthesis. This further improves the yield when manufacturing the friction member 20 having the desired shape.

The wear resistance of the friction member will now be described with reference to Table 1 and FIG. 9.

Mixtures shown in table 1 were used to mold workpieces containing at least copper powder, titanium powder, and carbon powder. The workpieces were subjected to combustion synthesis to form friction members of examples 2 to 5.

Mullite, zircon, and calcium fluoride are non-carbon hard particles serving as the additive material P2.

TABLE 1

| inorganic powder in workpiece CB | ex. 2 | ex. 3 | ex. 4 | ex. 5 |
|---|---|---|---|---|
| titanium (wt %) | 4 | 8 | 15 | 23 |
| copper (wt %) | 72 | 68 | 61 | 53 |
| graphite (wt %) | 10 | 10 | 10 | 10 |
| mullite (wt %) | 3 | 3 | 3 | 3 |
| zircon (wt %) | 4 | 4 | 4 | 4 |
| calcium fluoride (wt %) | 6 | 6 | 6 | 6 |
| Ti/Cu ratio (%) | 5.6 | 12 | 25 | 43 |

Figure 9:
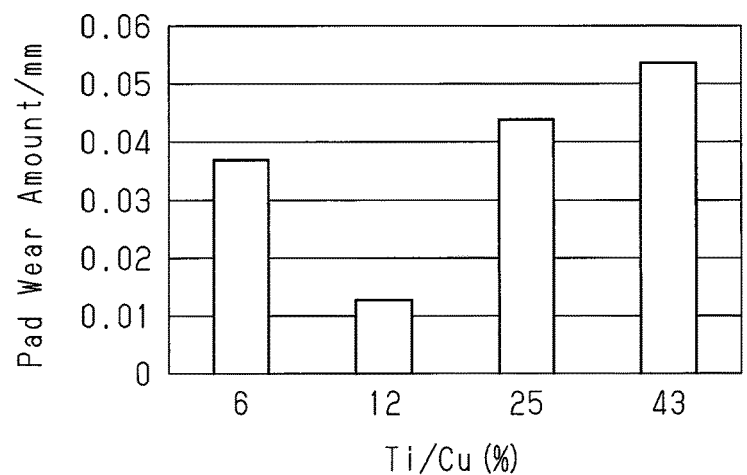
FIG. 9 is a graph showing the results of a wear resistance test conducted on the friction member in a number of examples.

Referring to FIG. 9, the wear amount decreases as the Ti/Cu ratio increases from 0.1%, decreases most when the Ti/Cu ratio is near approximately 12%, and increases afterward. The wear resistance is greater when the amount of wear is smaller.

Test results of several examples having a Ti/Cu ratio within 0.1% to 50% show a wear resistance that is superior to a conventional metal pad. Therefore, it is preferred that the workpiece CB contains 0.1 to 50 wt % of titanium powder relative to the total weight of copper powder. It is further preferred that the workpiece CB contains 5 to 15 wt % of titanium powder relative to the total weight of copper powder. By mixing titanium powder within this range, an inexpensive friction member 20 can be manufactured with a wear resistance that is equivalent or superior to the conventional metal pad. Particularly, it is preferred that the workpiece CB contains 10 to 15 wt % of titanium powder relative to copper powder. The mixing of titanium powder within this range obtains the friction member 20 that is superior to the conventional metal pad and has significant superiority in wear resistance.

Figure 10:
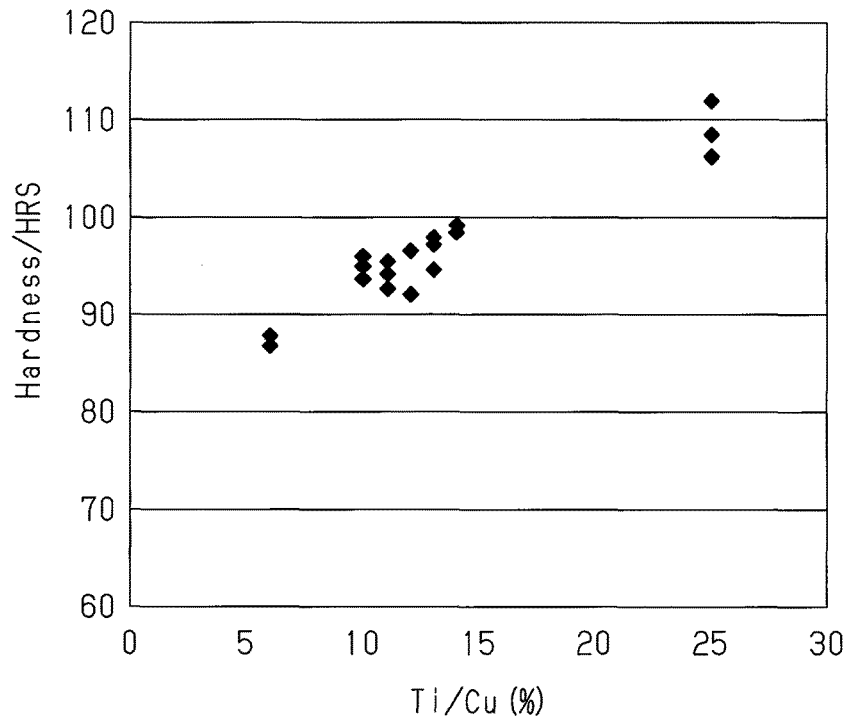
FIG. 10 is a graph showing the hardness of the friction members in a number of examples.

The hardness of several examples of friction members having a Ti/Cu ratio within 5% to 25% was obtained to study the relationship between the significantly improved wear resistance and the friction member hardness. The result is shown in FIG. 10. As the Ti/Cu ratio increases, the friction member hardness linearly increases. The results of FIGS. 9 and 10 show that the correlation coefficient between the wear resistance and the friction member hardness in the friction member is lower than one.

Figure 11:
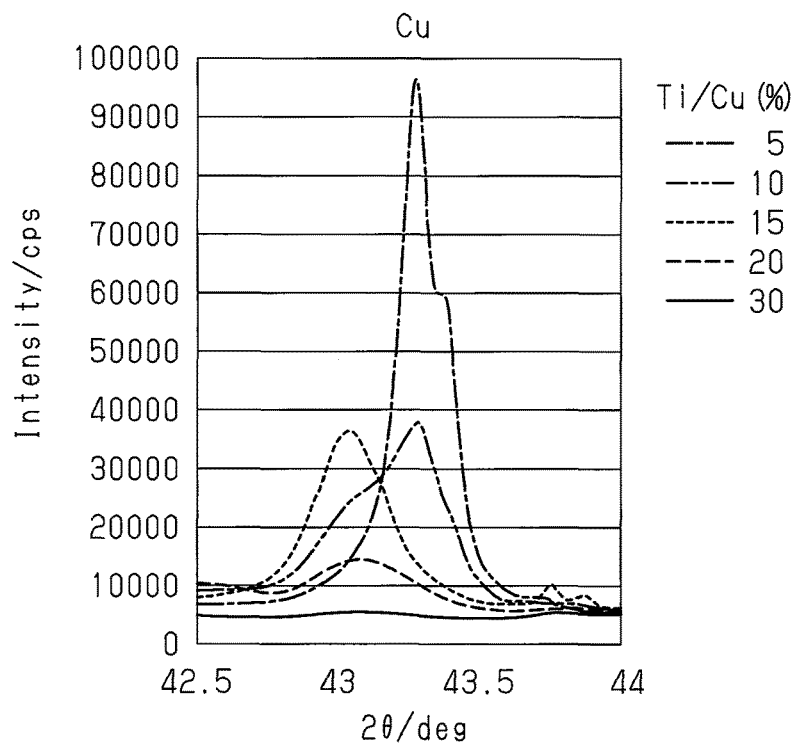
FIG. 11 is an X-ray analysis chart of friction members in examples having various Ti/Cu ratios and illustrates the diffraction peak intensity of Cu.
Figure 12:
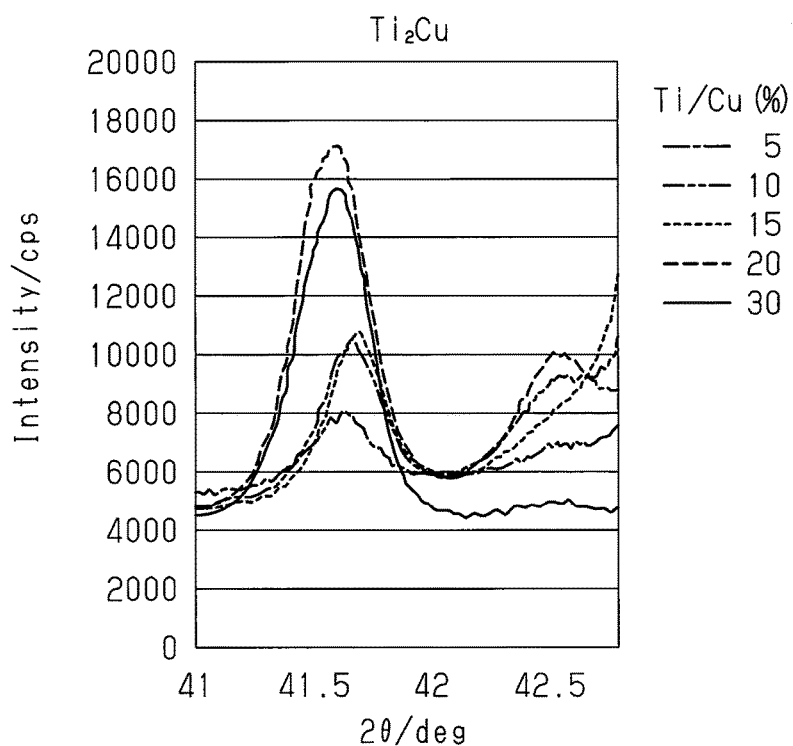
FIG. 12 is an X-ray analysis chart of friction members in examples having various Ti/Cu ratios and illustrates the diffraction peak intensity of $Ti_2Cu$.
Figure 13:
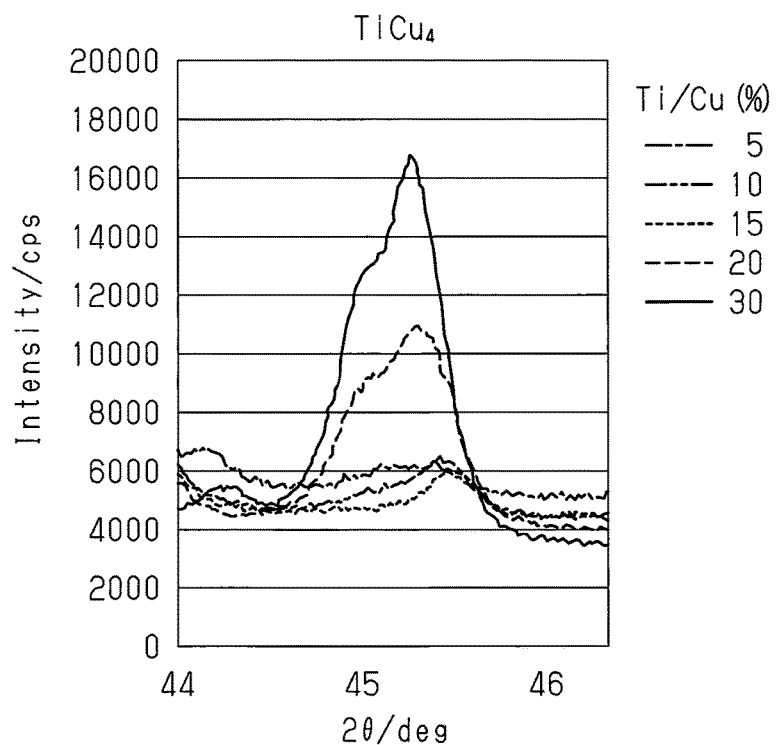
FIG. 13 is an X-ray analysis chart of friction members in examples having various Ti/Cu ratios and illustrates the diffraction peak intensity of $TiCu_4$.
Figure 14:
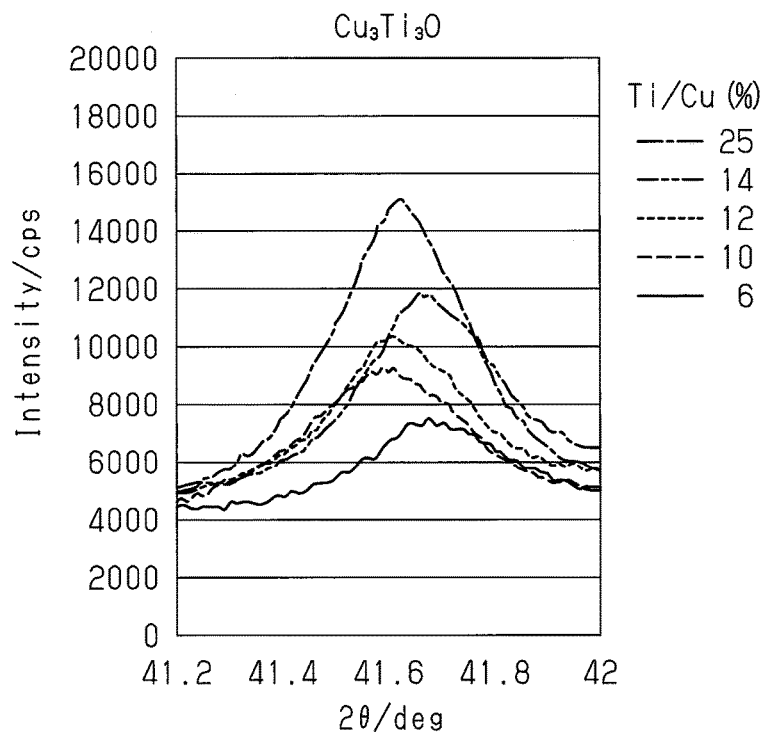
FIG. 14 is an X-ray analysis chart of friction members in examples having various Ti/Cu ratios and illustrates the diffraction peak intensity of $Cu_3Ti_3O$.

An X-ray structure analysis was performed on several examples of friction members having a Ti/Cu ratio within 5% to 30% to find the component that improves the wear resistance. The results are shown in FIGS. 11 to 14. As shown in FIGS. 11 to 13, as the Ti/Cu ratio increases, Cu decreases and the intermetallic compound including $Ti_2Cu$ and $TiCu_4$ increases. As shown in FIGS. 12 and 13, when the Ti/Cu ratio exceeds 20%, $Ti_2Cu$ and $TiCu_4$ greatly increases. Further, as shown in FIG. 14, $Cu_3Ti_3O$ increases as the Ti/Cu ratio increases. The X-ray structure analyses of FIGS. 12 to 14 show that the existence of $Cu_3Ti_3O$ and the intermetallic compound including at least one of $Ti_2Cu$ and $TiCu_4$ improved the wear resistance of the friction member.

In example 1, the metal materials P1 are the Cu powder P1a and the Ti powder P1b but may be the powders of at least two metal materials selected from a group consisting of Cu, Ti, Zn, Ni, and Al. In this case, the friction member 20 may be configured by a composite material including the first intermetallic compound formed from at least two selected from a group consisting of Cu, Ti, Zn, Ni, and Al. The brake pad 10 including this friction member 20 has advantages that are the same as or correspond to the advantages of example 1.

The first embodiment has the advantages described below.

(1) The bicycle brake pad 10 includes the friction member 20, which includes the first intermetallic compound 24, and the first support member 30. The friction member 20 and the first support member 30 are, at least partially, chemically coupled to each other. This structure easily obtains the brake pad 10 that has a simple structure. Further, the brake pad 10, which includes the friction member 20 that has a superior braking capacity, may be manufactured at a low cost. Moreover, the chemical coupling of the friction member 20 and the first support member 30 reduces or prevents the separation of the friction member 20 from the first support member 30.

(2) The brake pad 10 includes the friction member 20 and the first support member 30, which includes Al. The friction member 20 and the first support member 30 are, at least partially, inorganically and chemically coupled. The first support member 30, which includes Al, is light. This reduces the weight of the brake pad 10.

(3) The friction member 20 includes the first intermetallic compound 24. In this structure, due to the first intermetallic compound 24 of the friction member 20, the brake pad 10 has superior strength (in particular, tensile strength) and superior wear resistance.

(4) The brake pad 10 includes the friction member 20 and the first support member 30, which supports the friction member 20. The friction member 20 includes the first intermetallic compound 24 formed from at least two selected from a group consisting of Cu, Ti, Zn, Ni, and Al. In this structure, the thermal conductivity of the friction member 20 obtains the brake pad 10 having superior high-temperature braking force (fade performance).

(5) The first intermetallic compound 24 is produced by performing combustion synthesis on the metal materials P1 that includes at least two selected from a group consisting of Cu, Ti, Zn, Ni, and Al. The combustion synthesis is completed within an extremely short period of time. Thus, there is no need for continuous heating from the outside, and the amount of heating energy supplied from the outside may be reduced to an extremely small amount. Accordingly, the brake pad 10 may be manufactured at a low cost.

(6) The first intermetallic compound 24 is produced by performing combustion synthesis on the metal materials P1 with the additive material P2 added thereto. Thus, the braking performance of the brake pad 10 and other capabilities may be adjusted by changing the type and amount of the additive material P2.

(7) The additive material P2 includes carbon. This reduces braking noise, decreases cracks in the friction member 20, improves the yield of the friction member 20, and lowers the manufacturing cost of the brake pad 10.

(8) The metal materials P1 include Cu and Ti. The first intermetallic compound 24 includes at least one of TiCu, $Ti_2Cu$, $Ti_3Cu_4$, $Ti_2Cu_3$, and $TiCu_4$. Due to the Cu—Ti intermetallic compound, the high-temperature braking force (fade performance), the ratio of the braking force under a wet condition and the braking force under a dry condition (wet/dry ratio), and the wear resistance of the friction member 20 are improved in the brake pad 10. Further, the superior wear resistance of the friction member 20 prolongs the life of the brake pad 10.

(9) The friction member 20 further includes at least one of TiC and $Cu_3Ti_3O$. In this case, TiC and $Cu_3Ti_3O$ reduce movement of the first intermetallic compound 24 during combustion synthesis. Accordingly, the friction member 20 may be formed with the desired shape.

(10) The friction member 20 further includes the metal phase 22 that includes at least one of the metal materials P1. In this structure, due to the inherent thermal conductivity of the metal phase 22, the friction member 20 has superior thermal conductivity. Further, the inherent ductility and malleability of the metal phase 22 decreases the brittleness of the friction member 20. This reduces cracking and breakage of the friction member 20. Further, one or more types of the first intermetallic compound 24 may be dispersed in the metal phase 22. Preferably, the metal phase 22 includes Cu.

(11) The first support member 30 includes Al. The friction member 20 and the first support member 30 are, at least partially, inorganically and chemically coupled to each other by the second intermetallic compound, which is formed from at least one of the metal materials P1, and the Al of the first support member 30. Thus, the friction member 20 and the first support member 30 are directly coupled to each other (i.e., without a coupling member such as an adhesive agent or solder that is separate from the friction member 20 and the first support member 30) with a simple structure. This allows the structure of the brake pad 10 to be simplified. Further, the friction member 20 and the first support member 30 form the second intermetallic compound. This reduces separation of the friction member 20 and the first support member 30 and improves the durability of the brake pad 10.

(12) The second intermetallic compound is formed by the heat produced during the combustion synthesis of the first intermetallic compound. In this structure, combustion synthesis of the first intermetallic compound is induced locally on the workpiece CB. Thus, in a manner following the generation of the friction member 20, the coupling of the friction member 20 and the first support member 30 occurs as a chain reaction or occurs automatically. Accordingly, the brake pad 10 is obtained at a low cost.

(13) The metal materials P1 include Cu and Ti, and the second intermetallic compound includes $Al_2Cu$. In this structure, the Cu derived from the friction member 20 and the Al derived from the first support member 30 directly couple the friction member 20 and the first support member 30. This allows the structure of the brake pad 10 to be simplified.

(14) The brake pad 10 further includes the second support member 40 that supports the friction member 20 and the first support member 30. The first support member 30 and the second support member 40 are mechanically coupled. In this structure, the chemical coupling of the friction member 20 and the first support member 30 and the mechanical coupling of the first support member 30 and the second support member 40 integrates the friction member 20 and the second support member 40.

(15) The first support member 30 includes the projection 32, and the second support member 40 includes the recess 42. The heat produced during the combustion synthesis of the first intermetallic compound softens or melts the projection 32 of the first support member 30 so that the projection 32 enters the recess 42 of the second support member 40. This mechanically couples the first support member 30 and the second support member 40. In this structure, combustion synthesis of the first intermetallic compound is induced locally on the workpiece CB to at least partially melt or soften the first support member 30 and form the projection 32 engaged with the recess 42. This mechanically couples the first support member 30 and the second support member 40 without the need for continuous heating from the outside. Accordingly, the brake pad 10 is obtained at a low cost.

(16) The recess 42 of the second support member 40 is formed so that the diameter increases toward the opposite side of the friction member 20 and is, for example, a stepped through bore. This structure prevents or limits separation of the first support member 30 and the friction member 20 from the second support member 40. Thus, loosening of the first support member 30 and the friction member 20 from the second support member 40 is prevented or reduced. The first support member 30 contacts the upper surface 44 of the second support member 40. However, the opening of the recess 42 in the upper surface 44 is relatively small. This obtains a sufficient area of contact between the first support member 30 and the second support member 40.

(17) The method for manufacturing the brake pad 10 includes the first step (FIG. 2) of forming the workpiece CB that includes the metal materials P1 and the additive material P2; the second step (FIG. 3) of arranging the workpiece CB, the first support member 30 that includes metal, and the second support member 40 that includes the recess 42 so that the first support member 30 contacts the workpiece CB and the second support member 40; and the third step (FIGS. 4 and 5) of heating the workpiece CB to obtain the friction member 20. The third step includes generating the first intermetallic compound in the friction member 20 from at least two of the metal materials P1 (P1$a$, P1$b$) through combustion synthesis, chemically coupling the friction member 20 and the first support member 30 with the second intermetallic compound formed by the heat produced during combustion synthesis of the first intermetallic compound, and mechanically coupling the first support member 30 and the second support member 40 by softening or melting the first support member 30 with the heat produced during combustion synthesis of the first intermetallic compound so that the first support member 30 enters the recess 42 of the second support member 40. In this structure, combustion synthesis of the first intermetallic compound is induced locally on the workpiece CB to cause a chain reaction or automatic progress of sequences that end within a short period of time and include the generation of the friction member 20, the chemically coupling of the friction member 20 and the first support member 30, and the mechanical coupling of the first support member 30 and the second support member 40. Accordingly, the brake pad 10 may be manufactured at a low cost.

Figure 15:
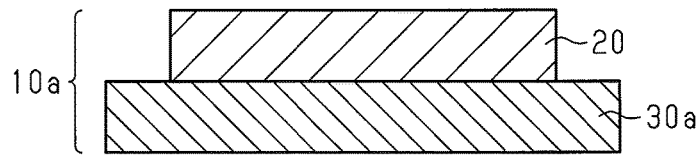
FIG. 15 is a schematic cross-sectional view showing a brake pad of a second embodiment.
Figure 16:
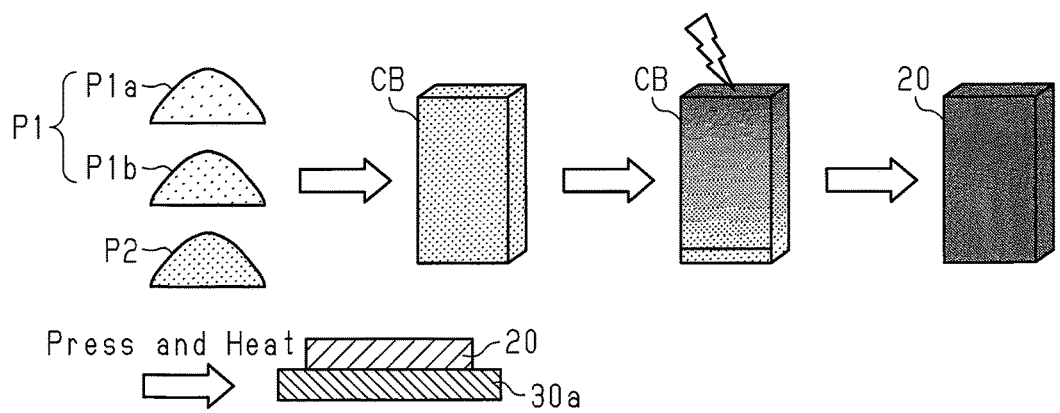
FIG. 16 is a schematic diagram illustrating a method for manufacturing the brake pad of the second embodiment.

With reference to FIG. 15, a bicycle brake pad 10$a$ of a second embodiment will now be described focusing on differences from the first embodiment. The brake pad 10$a$ includes the friction member 20, which includes a first intermetallic compound, and a first support member 30$a$. The friction member 20 and the first support member 30$a$ are, at least partially, chemically coupled to each other. The brake pad 10$a$ of the second embodiment does not include the second support member 40 shown in FIG. 1. The first support member 30$a$ of the second embodiment may be identical to the first support member 30 of the first embodiment except in that the first support member 30$a$ functions as a base member fixed to a brake pad mount, which is arranged on a brake caliper. The first support member 30$a$ is formed to have the shape of a plate such as a back plate. The friction member 20 is the same as that of the first embodiment.

A method for manufacturing the brake pad 10$a$ of the second embodiment will now be described.

In the same manner as the first step shown in FIG. 2, the workpiece CB is first formed. Then, the workpiece CB is heated with the workpiece CB separated from the first support member 30$a$ to induce combustion synthesis that generates the first intermetallic compound in the friction member 20. This obtains the friction member 20.

The friction member 20 and the first support member 30a are arranged to form a double-layer laminated body. The friction member 20 has a friction surface directed toward the outer side and a supported surface (which may be referred to as the coupling surface), which is located at the opposite side of the friction surface. The double-layer laminated body is heated and pressurized to manufacture the brake pad 10a. The heating and pressurizing conditions are set in accordance with the materials of the friction member 20 and the first support member 30a. The temperature and pressure are set to allow the friction member 20 and the first support member 30a to be, at least partially, chemically coupled to each other. The conditions may be adjusted in accordance with the composition of the first intermetallic compound in the friction member 20 and the material of the first support member 30a.

The coupling of the friction member 20 and the first support member 30a will now be described with reference to FIG. 17.

Figure 17:
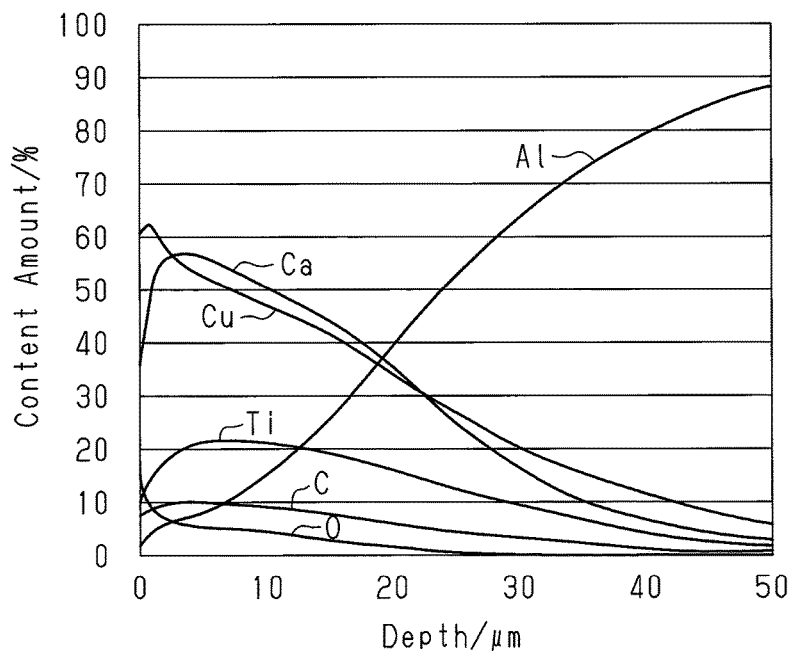
FIG. 17 is a graph illustrating diffusion bonding of a friction member and a first support member.

The vertical axis in FIG. 17 represents the content amount (%) of elements derived from the friction member 20 and the first support member 30a. Copper (Cu) and titanium (Ti) are derived from the first intermetallic compound of the friction member 20. Aluminum (Al) is derived from the first support member 30a. Oxygen (O) is mainly derived from an oxidation film existing on the surface of one or both of the friction member 20 and the first support member 30a. Some of the oxygen (O) is derived from non-carbon hard particles (mullite, zircon) serving as the additive material P2 of the reinforced phases 28 of the friction member 20 ($Cu_3Ti_3O$) and/or the additive material P2 of the friction member 20. Carbon (C) and calcium (Ca) are derived from the carbon and mullite included in the additive material P2 of the friction member 20. The horizontal axis in FIG. 17 represents depth. The depth is the distance from a reference surface level (e.g., contact surface of workpiece CB and first support member 30a in double-layer laminated body prior to pressurization) in the thickness-wise direction of the brake pad 10a. A smaller depth indicates that a sample has been collected from a location near the friction surface (upper surface in FIG. 15) of the friction member 20 in a boundary structure. A large depth indicates that a sample has been collected from a location far from the friction surface pf the friction member 20 in a boundary structure.

With reference to FIG. 17, the content amount of the elements derived from the friction member 20 (Cu, Ti, etc.) and the content rate of the elements derived from the first support member 30a are each depth-dependent. The elements derived from the friction member 20 (Cu, Ti, etc.) and the element derived from the first support member 30a (Al) coexist at the same depth. Accordingly, FIG. 17 shows that the boundary structure is formed by diffusing elements derived from one of the friction member 20 and the first support member 30a (e.g., friction member 20) in the other one of the friction member 20 and the first support member 30a (e.g., first support member 30a). In the example of FIG. 17, the boundary structure is formed throughout the depth range of 0 to approximately 100 μm (range from 50 μm not shown). The existence of the boundary structure indicates that the friction member 20 and the first support member 30a are, at least partially, inorganically and chemically coupled to each other by diffusion bonding.

In the present specification, the term "diffusion bonding" is defined as "metal elements derived from one of two metallic members diffused in the other metallic member to form a boundary structure or metal elements derived from two metallic members mutually diffused to form a boundary structure, and the boundary structure inorganically or chemically couples the two metallic components directly (i.e., without a coupling member such as an adhesive agent or solder that is separate from the two metallic members)."

Figure 18:
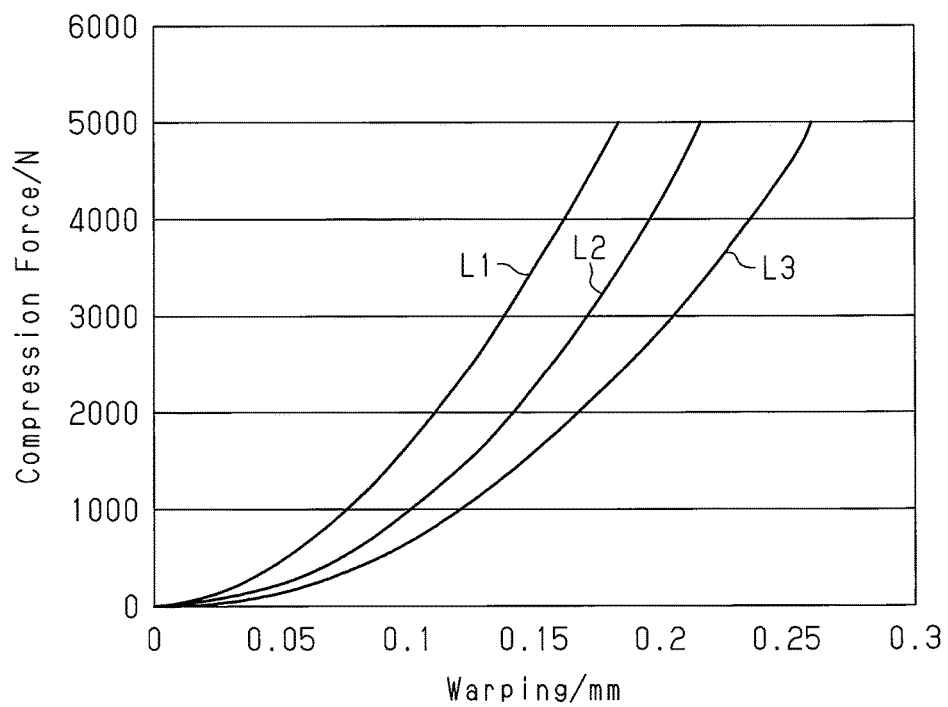
FIG. 18 is a graph illustrating warping of the brake pad of the second embodiment.

The effect of the brake pad 10a of the second embodiment will now be described with reference to FIG. 18. The vertical axis in FIG. 18 represents the compression force (pushing force) that bonds a friction member and a first support member. The horizontal axis represents warping that is the deformation amount of the brake pad subsequent to compression.

Characteristic line L1 indicates warping of a brake pad of example 6 that includes the friction member 20, which includes the first intermetallic compound, and the first support member 30a, which includes Al. Characteristic line L2 indicates warping of a brake pad of example 7 that includes the friction member 20, which includes the first intermetallic compound, and the first support member 30a, which includes Ti. Characteristic line L3 indicates warping of a brake pad of comparative example 3 that includes a bronze friction member, which is free from the first intermetallic compound, and a first support member, which includes Ti.

The facts described below are apparent from FIG. 18. In the brake pads of examples 6 and 7 (characteristic lines L1 and L2) including the friction member 20 that includes the first intermetallic compound, the warping that occurs after heating and pressurization was small. Thus, the brake pad was properly fixed to the brake pad mount. The friction member 20 and the first support member 30a can be compressed with a higher pressure. Thus, the strength of the friction member 20 and the first support member 30a may be increased. Further, the residual stress caused by warping was small, and separation of the friction member 20 and the first support member 30a was not observed.

Warping that occurs subsequent to heating and pressurization is large in the brake pad of comparative example 3 (characteristic line L3) that includes the bronze friction member. Thus, there were cases in which the brake pad could not be properly fixed to the brake pad mount. An increase in the compression force is difficult due to warping, and the bonding strength of the friction member and the first support member was insufficient. Further, the residual stress caused by warping was large. Thus, there were cases in which separation of the friction member and the first support member occurred immediately after the formation of the brake pad or subsequent to cooling.

Warping of the brake pad of example 6 (characteristic line L1) including the first support member that includes Al was smaller than the brake pad of example 7 (characteristic line L2) including the first support member that includes Ti. Thus, the friction member and the first support member can be compressed with a higher pressure. Accordingly, the strength of the diffusion bonding of the friction member and the first support member may be further increased.

The brake pad of example 6 (characteristic line L1) including the first support member that includes Al is lighter than the brake pads of example 7 (characteristic line L2) and comparative example 3 (characteristic line L3) including the first support member that includes Ti.

The first support member including Al (example 6) can be machined more easily than the first support member including Ti (example 7 and comparative example 3). For example, the first support member 30a having a fine structure of heat radiation fins may be obtained with a high yield.

Further, the heat radiation fins of the first support member 30*a* cooperate with the thermal conductivity of the friction member 20 to further improve the high-temperature braking force (fade performance) of the brake pad 10*a*.

The second embodiment has the advantages described below in addition to the advantages of the first embodiment.

(18) The friction member 20 and the first support member of the brake pad 10*a* in the second embodiment are diffusion-bonded so as to be, at least partially, inorganically and chemically coupled. In this structure, the friction member 20 and the first support member 30*a* may be coupled to each other in heating and pressurizing steps that are easy to control.

(19) The first support member 30*a* has the form of a plate. The first support member 30*a* functions as a base member fixed to a brake pad mount arranged on a brake caliper. This eliminates the need for a second support member that supports the friction member 20 and the first support member 30*a* and further reduces the weight of the brake pad 10*a*. When the first support member 30*a* is an Al plate, the low specific gravity of Al reduces the weight of the first support member 30*a*. This, in turn, reduces the weight of the brake pad 10*a*. Due to the machinability of Al, the first support member 30*a*, which has a fine structure including heat radiation fins and the like, may be obtained with a high yield. The low specified heat capacity of Al increases the high-temperature braking force (fade performance) of the brake pad 10*a*.

(20) The method for manufacturing the brake pad 10*a* includes the first step, which obtains the friction member 20, and the second step, which diffusion-bonds the friction member 20 and the first support member 30*a* by heating and pressurizing the friction member 20 and the first support member 30*a*. This method couples the friction member 20 and the first support member 30*a* in heating and pressurizing steps that are easy to control.

(21) The first step includes forming the workpiece CB that includes the metal materials P1 and the additive material P2 and generating the first intermetallic compound 24 from the metal materials P1 by heating the workpiece CB and performing combustion synthesis. The combustion synthesis allows the friction member 20 to be manufactured at a low cost. This, in turn, allows the brake pad 10*a* to be manufactured at a low cost.

It should be apparent to those skilled in the art that the present invention may be embodied in many other specific forms without departing from the spirit or scope of the invention. Particularly, it should be understood that the present invention may be embodied in the following forms.

In the third step (FIG. 4) of the first embodiment, a portion of the first support member 30 that is softened or melted enters the recess 42 of the second support member 40 due to its weight. However, the triple-layer laminated body may be pushed after applying an external heat stimulus to enhance the movement of the first support member 30 into the recess 42. This shortens the manufacturing time of the brake pad 10 and increases the yield of the brake pad 10. It is preferred that the workpiece CB or the friction member 20 be uniformly pressed from above. The pressure applied to the workpiece CB or the friction member 20 differs in accordance with the viscosity of the softened or melted first support member 30.

In the third step (FIG. 4) of the first embodiment, a block member may be arranged on the side surface of the first support member 30 that is exposed from between the friction member 20 and the second support member 40 to prevent or restrict the softened or melted portion of the first support member 30 from being squeezed out sideward from between the friction member 20 and the second support member 40.

Subsequent to the third step (FIG. 4) of the first embodiment, the brake pad 10 may be ground so that the second support member 40 becomes flush with the projection 32.

It is preferred that the friction member 20, which includes the first intermetallic compound, have a maximum dimension (e.g., length) of 5 cm or less. When the maximum dimension is 5 cm or less, the friction member 20 may be manufactured with a high yield. When the maximum dimension is greater than 5 cm, the friction member 20 may crack during combustion synthesis or when slowly cooled after the combustion synthesis. The bicycle brake friction member has a dimension that is approximately 5 cm at most and usually approximately 2 cm. This allows the friction member 20 to be manufactured with a high yield when performing combustion synthesis.

Figure 19A:
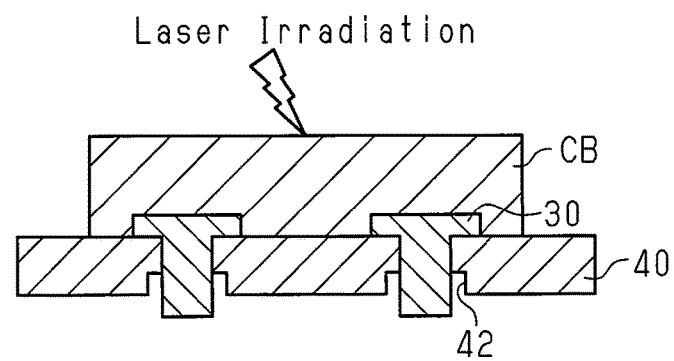
FIGS. 19A and 19B are schematic diagrams illustrating a method for manufacturing a brake pad of a first modified example.
Figure 19B:
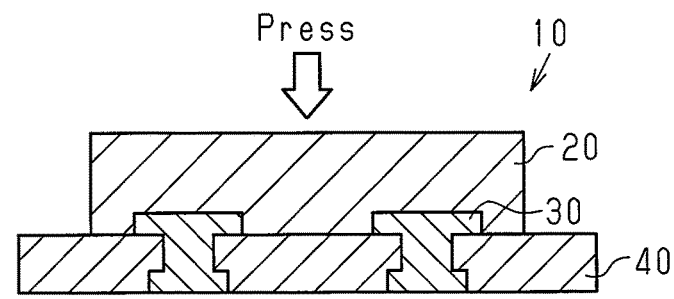

The first support member 30 of the first embodiment is not limited to the form of a flat plate. For example, as shown in FIG. 19A, the first support member 30 may be rivet-shaped. The rivet-shaped first support member 30 includes a head, which is embedded in the workpiece CB, and a body, which projects from the head. The body of the rivet-shaped first support member 30 is inserted into the recess 42 of the second support member 40. In this state, combustion synthesis is started by applying an external heat stimulus to the workpiece CB in order to locally induce a combustion reaction, which is an exothermic reaction, in the workpiece CB. The combustion synthesis generates the friction member 20. Further, the reaction heat of the combustion synthesis of the friction member 20 causes combustion synthesis of the second intermetallic compound between the friction member 20 and the head of the rivet-shaped first support member 30. The second intermetallic compound chemically bonds the friction member 20 and the rivet-shaped first support member 30. Referring to FIG. 19B, the reaction heat of the combustion synthesis softens or melts the distal end of the body of the rivet-shaped first support member 30 and forms the projection 32 that is casted by the recess 42, which serves as a mold. The engagement of the projection 32 and the recess 42 mechanically couples the first support member 30 and the second support member 40.

In the modified example of FIG. 19, the body of the rivet-shaped has a distal end projecting downward from the recess 42. This distal end is swaged to mechanically couple the first support member 30 and the second support member 40.

Figure 20A:
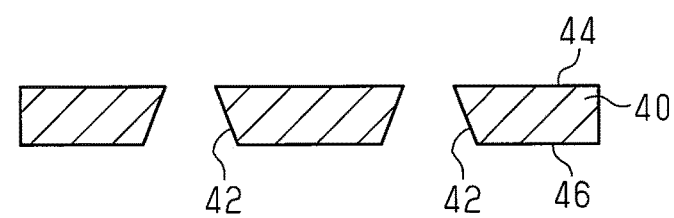
FIGS. 20A and 20B are schematic diagrams illustrating a method for manufacturing a second support member of a second modified example.
Figure 20B:
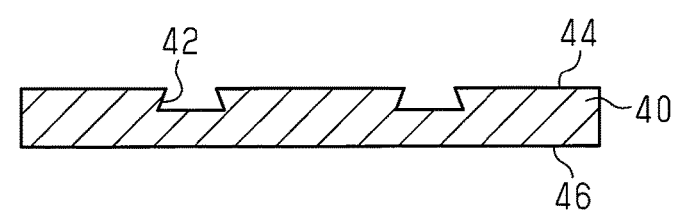

The recess 42 of the second support member 40 is not limited to a stepped through bore. For example, as shown in FIGS. 20A and 20B, the recess 42 may be formed so that the diameter increases as the friction member 20 becomes farther.

In the first embodiment, the second support member 40 may have the form of a plate that does not include the recess 42. In this case, the first support member 30 has the form of a plate that does not include the projection 32. In this modified example, the friction member 20 and the first support member 30 are also, at least partially, chemically coupled to each other. The friction member 20 includes the first intermetallic compound, which is formed from at least two of Cu, Ti, Zn, Ni, and Al. This improves the braking performance of the brake pad 10. Further, the friction member 20 is obtained through combustion synthesis. This lowers the cost for manufacturing the brake pad 10. In this modified example, the first support member 30 and the second support member 40 are integrated by, for example, an adhesive agent.

The brake pad 10 of each of the above embodiments and modified examples may be applied to any bicycle brake such as a disc brake and a rim brake. The shapes of the friction member 20, the first support members 30 and 30a, and the second support member 40 may be changed in accordance with the type of the brake.

The present examples and embodiments are to be considered as illustrative and not restrictive, and the invention is not to be limited to the details given herein, but may be modified within the scope and equivalence of the appended claims.

DESCRIPTION OF REFERENCE CHARACTERS 10, 10a bicycle brake pad
20 friction member
30, 30a first support member
32 projection
40 second support member
42 recess of second support member
44 upper surface of second support member
46 lower surface of second support member
CB workpiece
P1 (P1a, P1b) metal materials
P2 additive material

The invention claimed is:

1. A bicycle brake pad, comprising:
a friction member including a first intermetallic compound which is a Cu—Ti intermetallic compound including at least Cu and Ti; and
a first support member including Al, wherein the friction member and the first support member are, at least partially, chemically coupled to each other via a boundary structure including a second intermetallic compound which is a Cu—Al intermetallic compound composed of Cu derived from the friction member and Al derived from the first support member.

2. The brake pad according to claim 1, wherein the first intermetallic compound is produced by performing combustion synthesis on metal materials including at least Cu and Ti.

3. The brake pad according to claim 2, wherein the first intermetallic compound is produced by performing the combustion synthesis on the metal materials with an additive material added thereto.

4. The brake pad according to claim 3, wherein the additive material includes carbon.

5. The brake pad according to claim 4, wherein the Cu—Ti intermetallic compound is at least one of TiCu, $Ti_2Cu$, $Ti_3Cu_4$, $Ti_2Cu_3$, and $TiCu_4$.

6. The brake pad according to claim 5, wherein the friction member further includes at least one of TiC and $Cu_3Ti_3O$.

7. The brake pad according to claim 2, further comprising a second support member that supports the friction member and the first support member, wherein the first support member and the second support member are mechanically coupled to each other.

8. The brake pad according to claim 7, wherein:
the first support member includes a projection;
the second support member includes a recess; and
the first support member and the second support member are mechanically coupled to each other by the projection of the first support member that enters the recess of the second support member when combustion synthesis of the first intermetallic compound produces heat that softens or melts the projection.

9. The brake pad according to claim 8, wherein the recess of the second support member is increased in diameter toward an opposite side of the friction member.

10. The brake pad according to claim 9, wherein the recess of the second support member is a stepped through bore.

11. The brake pad according to claim 7, wherein the second support member has the form of a plate.

12. The brake pad according to claim 2, wherein the friction member further includes a metal phase including at least one of the metal materials.

13. The brake pad according to claim 12, wherein the metal phase includes Cu.

14. The brake pad according to claim 2, wherein
the friction member and the first support member are, at least partially, inorganically and chemically coupled to each other by the second intermetallic compound.

15. The brake pad according to claim 14, wherein the second intermetallic compound is formed by heat produced during combustion synthesis of the first intermetallic compound.

16. The brake pad according to claim 14, wherein
the second intermetallic compound includes $Al_2Cu$.

17. The brake pad according to claim 1, wherein the first intermetallic compound is produced by performing combustion synthesis on metal materials including at least Cu and Ti.

18. The brake pad according to claim 17, wherein the first intermetallic compound is produced by performing the combustion synthesis on the metal materials with an additive material added thereto.

19. The brake pad according to claim 18, wherein the additive material includes carbon.

20. The brake pad according to claim 19, wherein
the Cu—Ti intermetallic compound is at least one of TiCu, $Ti_2Cu$, $Ti_3Cu_4$, $Ti_2Cu_3$, and $TiCu_4$.

21. The brake pad according to claim 20, wherein the friction member further includes at least one of TiC and $Cu_3Ti_3O$.

22. The brake pad according to claim 17, further comprising a second support member that supports the friction member and the first support member, wherein the first support member and the second support member are mechanically coupled to each other.

23. The brake pad according to claim 22, wherein:
the first support member includes a projection;
the second support member includes a recess; and
the first support member and the second support member are mechanically coupled to each other by the projection of the first support member that enters the recess of the second support member when combustion synthesis of the first intermetallic compound produces heat that softens or melts the projection.

24. The brake pad according to claim 23, wherein the recess of the second support member is increased in diameter toward an opposite side of the friction member.

25. The brake pad according to claim 24, wherein the recess of the second support member is a stepped through bore.

26. The brake pad according to claim 22, wherein the second support member has the form of a plate.

27. The brake pad according to claim 17, wherein
the friction member and the first support member are, at least partially, inorganically and chemically coupled to each other by the second intermetallic compound.

28. The brake pad according to claim 27, wherein the second intermetallic compound is formed by heat produced during combustion synthesis of the first intermetallic compound.

29. The brake pad according to claim 27, wherein
the second intermetallic compound includes $Al_2Cu$.

30. The brake pad according to claim 17, wherein the friction member further includes a metal phase including at least one of the metal materials.

31. The brake pad according to claim 30, wherein the metal phase includes Cu.

32. The bicycle brake pad according to claim 1, wherein
the friction member includes a metal phase and the first intermetallic compound is dispersed in the metal phase, and
the second intermetallic compound of the boundary structure is composed only of Cu derived from at least one of the metal phase and the first intermetallic compound of the friction member, and Al derived from the first support member.

33. The bicycle brake pad according to claim 32, wherein the second intermetallic compound of the boundary structure is composed of Cu derived from the metal phase of the friction member, and Al derived from the first support member at a certain ratio.

34. The bicycle brake pad according to claim 32, wherein the boundary structure includes a diffusion bonding structure in which amounts of a selected one of first chemical species derived from the first intermetallic compound of the friction member and a selected one of second chemical species derived from the first support member vary depending on depth from a reference surface level between the friction member and the first support.

35. The brake pad according to claim 1, wherein the friction member and the first support member are, at least partially, inorganically and chemically coupled to each other by diffusion bonding.

36. The brake pad according to claim 35, wherein the first support member has the form of a plate.

37. A bicycle brake pad, comprising:
a friction member including a first intermetallic compound which is a Cu—Ti intermetallic compound including at least Cu and Ti; and
a first support member that supports the friction member, the first support member and the friction member being coupled to each other by a second intermetallic compound which is a Cu—Al intermetallic compound composed of Cu derived from the friction member and Al derived from the first support member.

38. The brake pad according to claim 37, wherein the first intermetallic compound is produced by performing combustion synthesis on metal materials including at least Cu and Ti.

39. The brake pad according to claim 38, wherein the first intermetallic compound is produced by performing the combustion synthesis on the metal materials with an additive material added thereto.

40. The brake pad according to claim 39, wherein the additive material includes carbon.

41. The brake pad according to claim 40, wherein
the Cu—Ti intermetallic compound is at least one of TiCu, $Ti_2Cu$, $Ti_3Cu_4$, $Ti_2Cu_3$, and $TiCu_4$.

42. The brake pad according to claim 41, wherein the friction member further includes at least one of TiC and $Cu_3Ti_3O$.

43. The brake pad according to claim 38, further comprising a second support member that supports the friction member and the first support member, wherein the first support member and the second support member are mechanically coupled to each other.

44. The brake pad according to claim 43, wherein:
the first support member includes a projection;
the second support member includes a recess; and
the first support member and the second support member are mechanically coupled to each other by the projection of the first support member that enters the recess of the second support member when combustion synthesis of the first intermetallic compound produces heat that softens or melts the projection.

45. The brake pad according to claim 44, wherein the recess of the second support member is increased in diameter toward an opposite side of the friction member.

46. The brake pad according to claim 45, wherein the recess of the second support member is a stepped through bore.

47. The brake pad according to claim 43, wherein the second support member has the form of a plate.

48. The brake pad according to claim 38, wherein
the friction member and the first support member are, at least partially, inorganically and chemically coupled to each other by the second intermetallic compound.

49. The brake pad according to claim 48, wherein the second intermetallic compound is formed by heat produced during combustion synthesis of the first intermetallic compound.

50. The brake pad according to claim 48, wherein
the second intermetallic compound includes $Al_2Cu$.

51. The brake pad according to claim 38, wherein the friction member further includes a metal phase including at least one of the metal materials.

52. The brake pad according to claim 51, wherein the metal phase includes Cu.

53. The brake pad according to claim 37, wherein the friction member and the first support member are, at least partially, inorganically and chemically coupled to each other by diffusion bonding.

54. The brake pad according to claim 53, wherein the first support member has the form of a plate.

55. A bicycle brake pad, comprising:
a friction member including a first intermetallic compound which is a Cu—Ti intermetallic compound including at least Cu and Ti; and
a first support member including Al, wherein the friction member and the first support member are, at least partially, inorganically and chemically coupled to each other via a boundary structure including a second intermetallic compound which is a Cu—Al intermetallic compound composed of Cu derived from the friction member and Al derived from the first support member.

56. The brake pad according to claim 55, wherein the friction member and the first support member are, at least partially, inorganically and chemically coupled to each other by diffusion bonding.

57. The brake pad according to claim 56, wherein the first support member has the form of a plate.

58. A bicycle brake pad, comprising:
a friction member including a Cu—Ti intermetallic compound including at least Cu and Ti; and
a first support member including Al, wherein the friction member and the first support member are, at least partially, chemically and directly coupled to each other and form a Cu—Al intermetallic compound composed of Cu derived from the friction member and Al derived from the first support member.

\* \* \* \* \*